DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED OCTOBER 7, 1975

939 O.G. 8

T939,005

SPENT REGENERANT PROCESSING SYSTEM

David Norman Enegess, East Windsor, and Phillip Daniel Paquette, Enfield, Conn., and Hashem N. Elsherif, Cleveland, Ohio, assignors to Combustion Engineering, Inc., Windsor, Conn.

Filed Mar. 20, 1974, Ser. No. 452,857
Int. Cl. C09k *3/00*
U.S. Cl. 252—301.1 W
1 Sheet Drawing. 9 Pages Specification

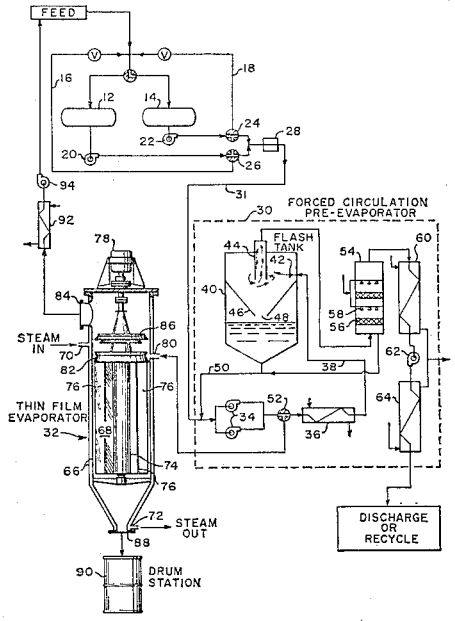

This invention involves a system for processing liquid wastes containing dissolved solids which result from the operation of a nuclear steam supply system. The processing sequence is to first collect the liquid wastes in hold-up tanks (12 and 14). When sufficient volume is collected, the liquid waste is pumped through a filter (28) to the first stage of a dual evaporation process. This first stage, the pre-concentrator, consists of a forced-circulation evaporator (30) with a very high bottoms-to-distillate decontamination factor. The concentrate from this unit is fed to one of two thin film evaporators (32) which further concentrates the liquid waste and discharges solids of low moisture content. The solids are then drummed and shipped off-site for disposal. The distillate produced from the thin film evaporator is recycled back to the original collection tanks in order to maintain a very high overall decontamination factor for the distillate.

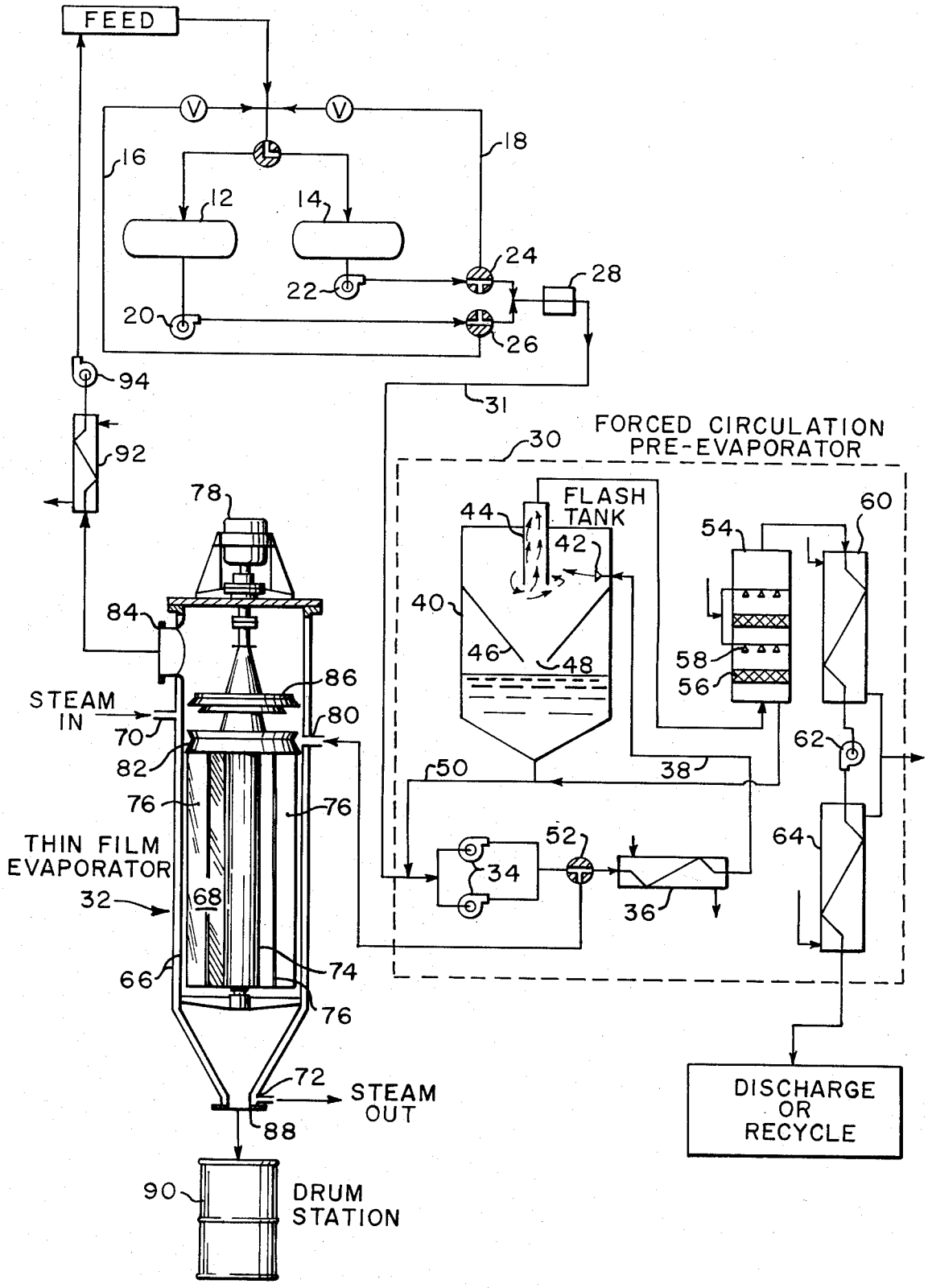

SPENT REGENERANT PROCESSING SYSTEM
Original Filed March 20, 1974